US012406425B2

(12) United States Patent
Livesley et al.

(10) Patent No.: US 12,406,425 B2
(45) Date of Patent: Sep. 2, 2025

(54) VERTEX INDEX ROUTING FOR TWO LEVEL PRIMITIVE BATCH BINNING

(71) Applicant: Advanced Micro Devices, Inc., Santa Clara, CA (US)

(72) Inventors: Michael John Livesley, Milton Keynes (GB); Vishrut Vaibhav, Orlando, FL (US); Tad Robert Litwiller, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 324 days.

(21) Appl. No.: 18/089,456

(22) Filed: Dec. 27, 2022

(65) Prior Publication Data

US 2024/0070961 A1    Feb. 29, 2024

Related U.S. Application Data

(60) Provisional application No. 63/400,692, filed on Aug. 24, 2022.

(51) Int. Cl.
  *G06T 15/00*    (2011.01)
(52) U.S. Cl.
  CPC ........ *G06T 15/005* (2013.01); *G06T 2210/52* (2013.01)
(58) Field of Classification Search
  CPC ....... G06T 15/005; G06T 15/00; G06T 15/10; G06T 15/205; G06T 15/80; G06T 17/05; G06T 17/10; G06T 17/20; G06T 11/40; G06T 1/20; G06T 2210/52
  See application file for complete search history.

(56) References Cited

U.S. PATENT DOCUMENTS

| | | | |
|---|---|---|---|
| 8,963,933 B2 | 2/2015 | Hartog et al. | |
| 9,396,032 B2 | 7/2016 | Nalluri et al. | |
| 9,842,376 B2 | 12/2017 | Acharya et al. | |
| 10,134,103 B2 | 11/2018 | Acharya et al. | |
| 10,210,593 B2 | 2/2019 | Acharya et al. | |
| 10,991,152 B2 * | 4/2021 | He | G06T 15/80 |
| 11,972,518 B2 * | 4/2024 | Tuomi | G06T 1/20 |
| 2017/0091895 A1 | 3/2017 | Acharya et al. | |
| 2017/0132834 A1 * | 5/2017 | He | G06T 15/005 |
| 2017/0161863 A1 | 6/2017 | Baral et al. | |
| 2018/0307533 A1 | 10/2018 | Tian et al. | |
| 2020/0159587 A1 | 5/2020 | Li et al. | |
| 2020/0226822 A1 | 7/2020 | Sundaram et al. | |
| 2021/0225060 A1 * | 7/2021 | Tuomi | G06T 1/20 |
| 2021/0287418 A1 * | 9/2021 | Acharya | G06T 11/40 |
| 2022/0156874 A1 | 5/2022 | Acharya et al. | |
| 2022/0301095 A1 | 9/2022 | Dagani et al. | |

* cited by examiner

Primary Examiner — Vijay Shankar
(74) Attorney, Agent, or Firm — Volpe Koenig (57) ABSTRACT

Techniques for performing rendering operations are disclosed herein. The techniques include in a coarse binning pass, generating a sorted set of draw calls, based on geometry processed through a world space pipeline and vertex indices obtained from an input assembler. The techniques also include initiating a fine binning pass in which the sorted set of draw calls is processed through the world-space pipeline and the screen-space pipeline.

20 Claims, 9 Drawing Sheets

VERTEX INDEX ROUTING FOR TWO LEVEL PRIMITIVE BATCH BINNING

CROSS-REFERENCE TO RELATED APPLICATIONS

This application claims the benefit of U.S. Provisional Application No. 63/400,692, filed on Aug. 24, 2022, the entirety of which is hereby incorporated herein by reference.

BACKGROUND

Hardware-accelerated three-dimensional graphics processing is a technology that has been developed for decades. In general, this technology identifies colors for screen pixels to display geometry specified in a three-dimensional coordinate space. Improvements in graphics processing technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing rendering operations are disclosed herein. The techniques include in a coarse binning pass, generating a sorted set of draw calls, based on geometry processed through a world space pipeline and vertex indices obtained from an input assembler.

Figure 1:
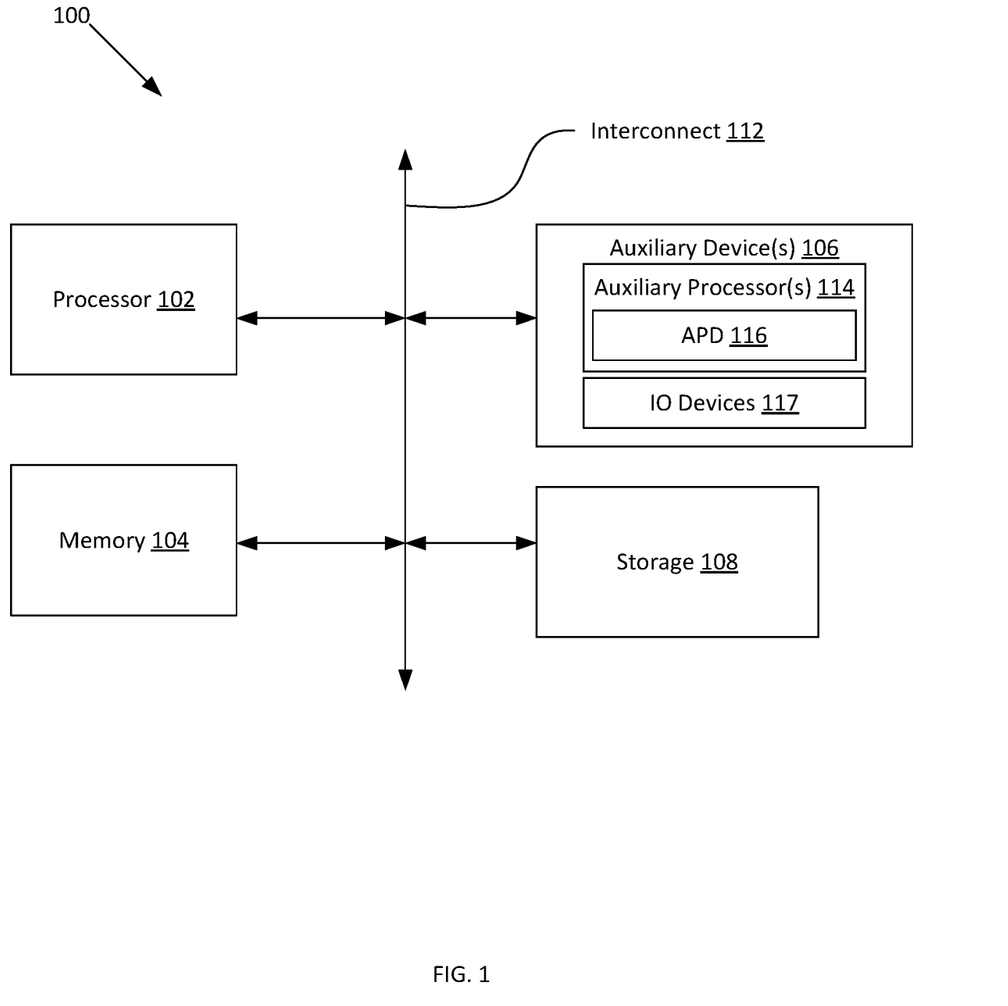
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
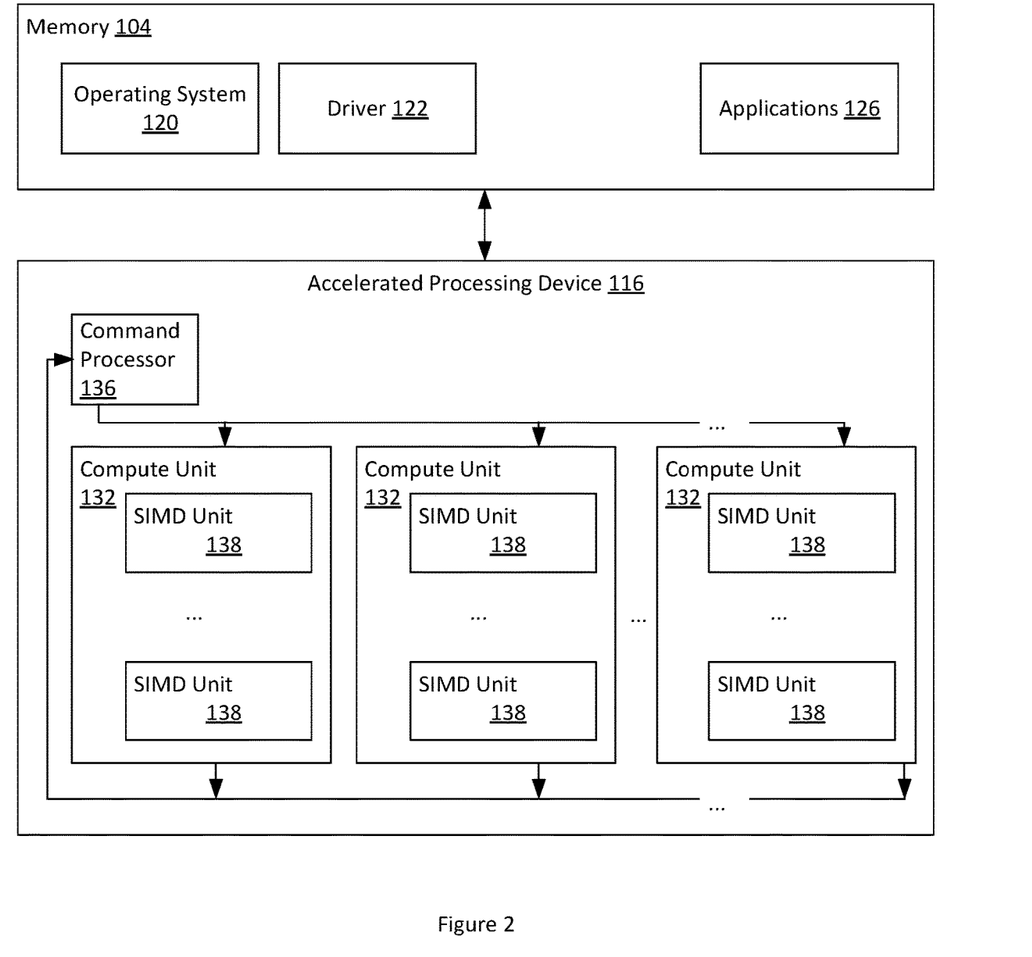
FIG. 2 illustrates details of the device of FIG. 1, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
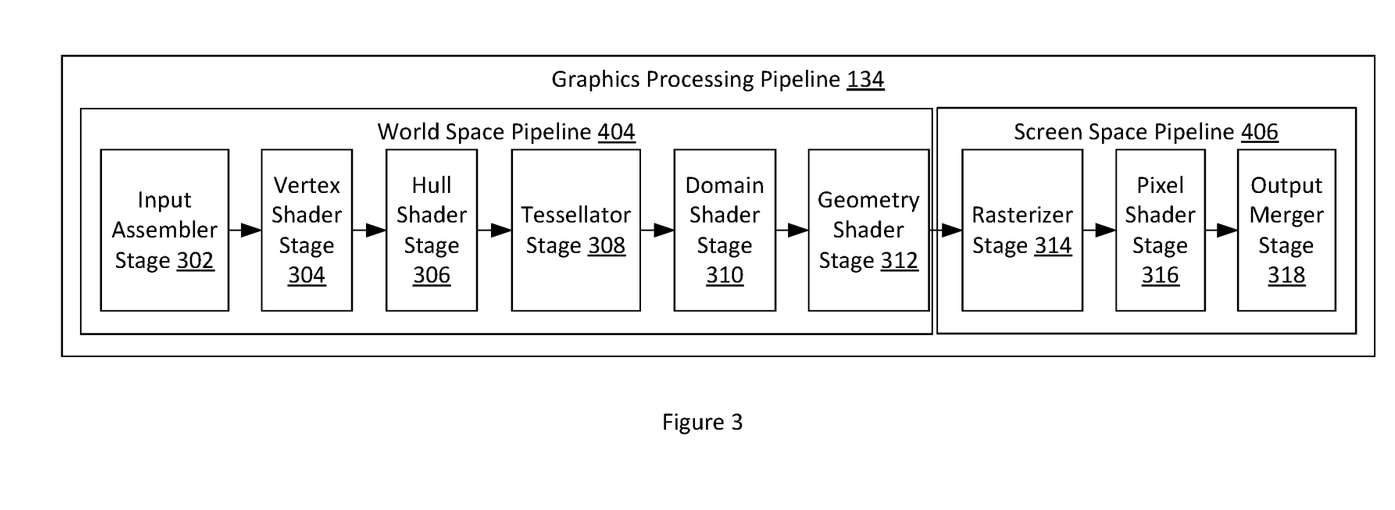
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Figure 4:
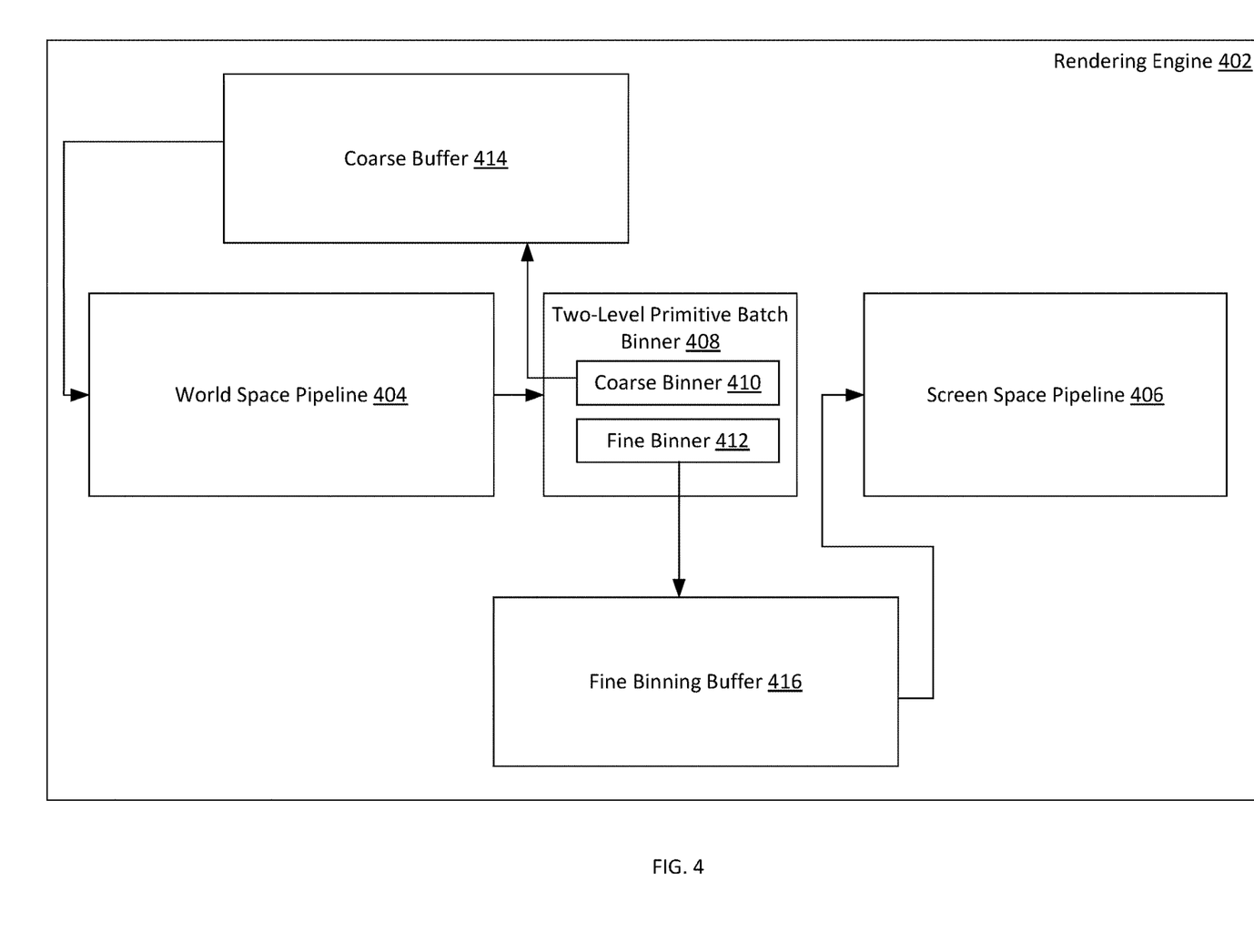
FIG. 4 illustrates additional details for the graphics processing pipeline.

The graphics processing pipeline 134 is divided into a world-space pipeline 404 and a screen-space pipeline 406. The world-space pipeline 404 converts geometry in world-space into triangles in screen space. The world-space pipeline 404 includes at least the vertex shader stage 304 (which transforms the coordinates of triangles from world-space coordinates to screen-space coordinates plus depth). In some examples, the world-space pipeline 404 also includes one or more of the input assembler stage 302, the hull shader stage 306, the tessellator stage 308, the domain shader stage 310, and the geometry shader stage 312. In some examples, the world-space pipeline 404 also includes one or more other elements not illustrated or described herein. The screen-space pipeline 406 generates colors for pixels of a render target (e.g., a screen buffer for display on a screen) based on the triangles in screen space. The screen-space pipeline 406 includes at least the rasterizer stage 314, the pixel shader stage 316, and the output merger stage 318, and also, in some implementations, includes one or more other elements not illustrated or described herein.

FIG. 4 illustrates a rendering engine 402 that includes a two-level primitive batch binner 408, according to an example. A rendering engine 402 is an instance that includes a graphics processing pipeline 134. Multiple rendering engines 402 are capable of executing in parallel by, for example, processing different portions of the screen or by processing different geometry. The two-level primitive batch binner 408 performs binning on two levels: a coarse level and a fine level. In general, binning means collecting geometry information into one or more buffers and "replaying" that information in tile order. For coarse binning, ordering is performed with respect to coarse tiles and for fine binning, ordering is performed with respect to fine tiles. Replaying that information in tile order means sending the information in the buffer that overlaps a first tile to a portion of the rendering engine 402 for rendering, then sending the information in the buffer that overlaps a second tile to the portion for rendering, and so on. Binning in this manner gains benefits related to temporal and spatial cache locality. More specifically, by "reordering" work to be rendered on a tile-by-tile basis, work that requires data that is close together in memory will be performed together, meaning that accesses to memory close together will be performed close together in time, which increases the likelihood that information fetched into a cache for the rendering engine 402 will be reused before being evicted, which reduces the overall number of misses, improves performance, reduces bandwidth in accesses to external memory, and reduces power consumption as a result. In various examples, the amount of work that is collected into the buffer is dependent on the size of the buffer, the type of work that is collected into the buffer, and the timing (e.g., relative to the frame or other timing aspect) of the work collected into the buffer. In some examples, the buffer collects geometry until the buffer is full and then replays the contents of the buffer. In some examples, the buffer replays the contents of the buffer after a different event occurs, such as the frame ending, or receiving an explicit indication to replay the contents of the buffer.

In general, two-level binning occurs in the following manner. A coarse binner 410 orders geometry output from the world space pipeline 404 into coarse bins. Each coarse bin includes geometry that overlaps a portion of screen space associated with that coarse bin. The coarse bins are larger than the fine bins for which fine binning occurs. The geometry overlapping the coarse bins is stored in the coarse buffer 414. The coarse buffer 414 replays the geometry to the world-space pipeline 404 in coarse bin order. The fine binner 412 stores the geometry into fine bins in the fine binning buffer 416. The fine binning buffer 416 then replays the fine bins in fine bin order. The fine bins are smaller than the coarse bins.

Because the coordinates of geometry are in world space at the beginning of the world-space pipeline 404, the first level includes processing the geometry through the world-space pipeline 404 to convert such geometry into screen space. Note that in this first level, in some examples, the geometry does not proceed to the screen-space pipeline 406, since the purpose of coarse binning is to increase the locality of geometry fed to the second level of binning (the fine binning). In some examples, in addition to storing, into the coarse buffer 414, information regarding which coarse bins the geometry falls within, the coarse binner 410 also stores geometry into the coarse buffer 414 in a manner that indicates or is associated with visibility testing performed in the world space pipeline 404. More specifically, the world-space pipeline 404 performs certain tests to determine whether geometry is visible. Such tests include backface culling, which removes triangles whose back face is facing the camera (and is thus invisible), and, optionally, other forms of culling. The coarse binner 410 does not store geometry into the coarse buffer 414 if that geometry is determined to be culled by the world-space pipeline 404 in the coarse binning pass. In addition, the world-space pipeline 404 performs clipping. Clipping clips portions of geometry that fall outside of the viewport. In some examples, for triangles that are clipped, the world-space pipeline 404 converts such triangles into new triangles that occupy the space of the clipped triangle.

In sum, the coarse binner 410 performs coarse binning that includes at least two operations: the coarse binner 410 categorizes geometry processed through the world-space pipeline 404 as overlapping one or more individual coarse bins; and the coarse binner 410 stores the geometry in a way that indicates visibility information. Stated differently, in addition to organizing the coarse tiles, the coarse binner 410 may also store data in a way that indicates which triangles are culled (e.g., by culling operations of the world space pipeline 404 such as frustum culling, back-face culling, or other culling operations), such as by not storing data for triangles that have been culled.

The coarse binner 410 may store the sorted geometry in the coarse buffer 414 as draw calls and/or as compressed data that represents the geometry of a draw call, and may omit triangles that are culled. A draw call is an input to the rendering engine 402 that provides geometry such as vertices and requests rendering of that geometry. The term "call" refers to the fact that a draw call is a function in a graphics application programming interface ("API") made available to software, such as software executing on a central processing unit.

The purpose of the coarse level of binning is to enhance the ability of the fine binning operations to group together geometry. More specifically, when a coarse tile is being replayed, the coarse level tile restricts geometry sent to the fine binner 412 to a coarse tile, which increases the amount of geometry in any particular fine binning tile. By including geometry restricted to a particular area of the render target (a coarse tile), fewer fine tiles will be involved in the fine binning operations, and more geometry will be within those fine tiles. This increased "crowding" improves the benefits obtained through fine binning, since more data is involved in the cache locality enhancements of fine binning. The data is replayed in tile order so that the entire render surface is covered, but in the order of coarse tile.

Figure 5:
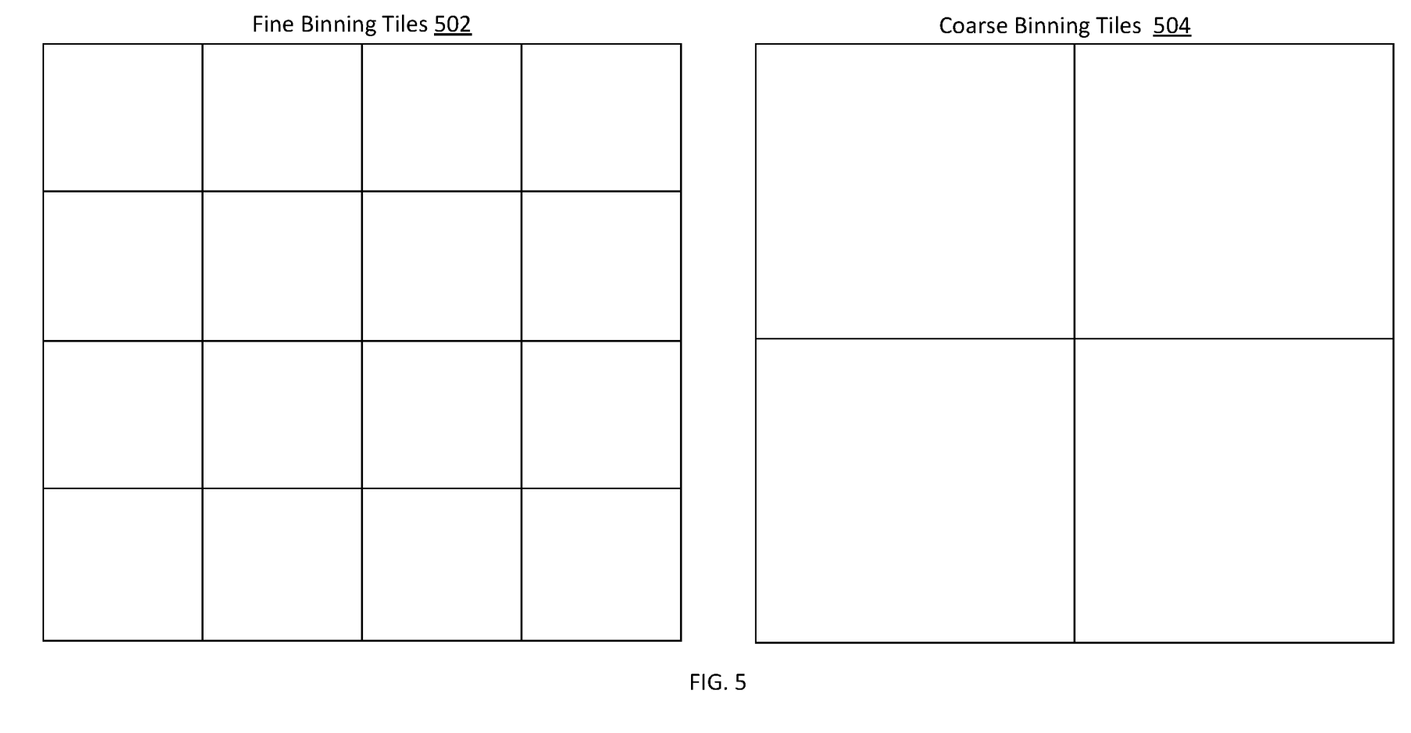
FIG. 5 illustrates screen subdivisions for binning operations.

FIG. 5 illustrates fine binning tiles 502 and coarse binning tiles 504. The fine binning tiles 502 illustrate the size of the tiles that the fine binner 412 organizes geometry into. The coarse binning tiles 504 illustrate the size of the tiles that the coarse binner 410 organizes geometry into. The coarse binning tiles 504 are larger than the fine binning tiles 502.

More specifically, the coarse binning tiles 504 represent the portions of the render target that the coarse binner 410 organizes geometry into. As stated above, the coarse binner 410 sorts geometry based on which coarse tile the geometry overlaps. The coarse binning tiles 504 are the tiles upon which this sorting is based.

Similarly, the fine binning tiles 502 are the portions of the render target that the fine binner 412 organizes geometry into. The fine binner 412 sorts incoming geometry based on which fine binning tile 502 the geometry overlaps.

Figure 6:
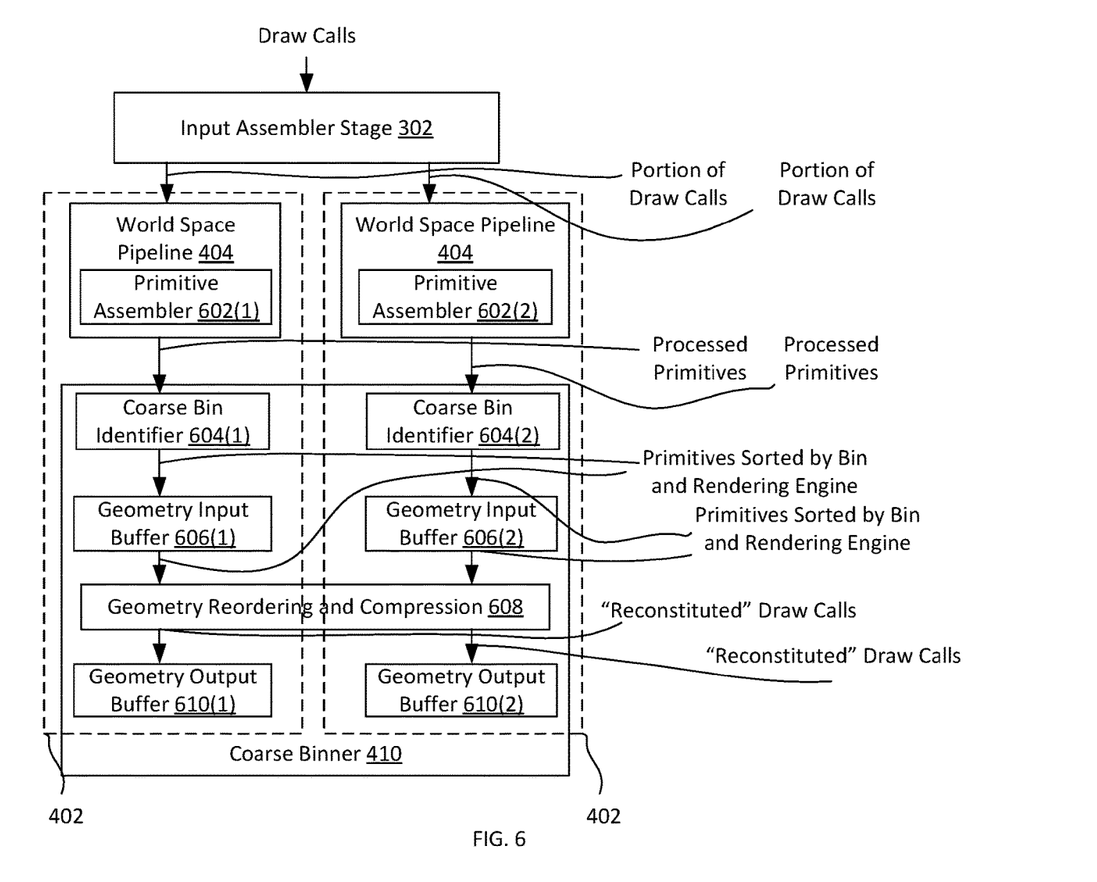
FIG. 6 illustrates an example configuration in which multiple render engines perform rendering operations including those described with respect at least to FIG. 4.

It is possible for the operations described herein to be performed at least partially in parallel. FIG. 6 illustrates an example configuration in which multiple render engines 402 perform rendering operations including those described with respect at least to FIG. 4 (e.g., rendering through the world space pipeline 404, binner 408, and screen space pipeline 406). FIG. 6 illustrates operations concerned with the coarse binning operations, and thus illustrates the world-space pipeline 404 and the coarse binner 410. The world space pipeline 404 includes the elements described with respect to FIG. 3. The input assembler stage 302 is illustrated independently from the remainder of the world-space pipeline 404, but could be considered part of the world-space pipeline 404. A primitive assembler stage 602 is also shown as part of the world-space pipeline 404 but is not shown in FIG. 3.

As stated above, FIG. 6 illustrates operations associated with coarse binning performed by multiple rendering engines 402. The input assembler stage 302 accepts draw calls (e.g., from the processor 102 via the APD scheduler 136). The draw calls specify geometry to render. The draw calls include triangles or other geometry defined by vertex indices. A vertex index is a reference to vertex data such as coordinates and/or other data. Each vertex index is a reference to an item of data for one vertex stored in a buffer. Draw calls specify geometry by vertex indices, rather than indices, to reduce the size of the draw calls and to avoid duplication of vertex data. In an example, a vertex index is specified with a single value (e.g., 32 bit or 64 bit value) while coordinates are specified with three values. Thus including an index rather than a vertex in a draw call allows the draw calls to be smaller.

The input assembler stage 302 accepts draw calls and divides the draw calls between the parallel rendering engines 402. Specifically, the draw calls are divided to parallel world space pipelines 404 for processing. The division of these vertices occurs in any technically feasible manner. In general, the input assembler stage 302 selects some of the draw calls for processing by one rendering engine 402 (e.g., world space pipeline 404) and selects other draw calls for processing by the other rendering engine 402. In some examples, the input assembler stage 302 divides draw calls based on primitive groups, and sends a portion of a draw call to one rendering engine 402 and a different portion of the draw call to a different rendering engine 402. Specifically, the input assembler stage 302 divides the draw calls based on primitive groups and sends each particular primitive group to a particular rendering engine 402. A primitive group can be smaller than a draw call, and includes a plurality of primitives.

In some examples, the processing performed by each world space pipeline 404 includes at least vertex shading, which includes transformation of vertex positions from world space to screen space. In the course of processing the draw calls, the world-space pipeline 404 obtains the vertex data based on the provided indices, but does not maintain the original indices, as that information is considered extraneous at this point. A primitive assembler 602 collects vertex data into primitives (vertex assembly) and performs culling and clipping on the primitives. Culling removes primitives that are not visible. In some examples, primitives are not visible due to being outside of the view frustum (the portion of space that is visible to the camera). The primitive assembler 602 culls or removes these primitives. In some examples, primitives are partially visible due to being partially outside of the view frustum. In such examples, the primitive assembler 602 clips such primitives, reducing the size of such primitives to fit within the view frustum. In various examples, the primitive assembler 602 performs other operations on the triangles, such as performing additional coordinate transforms, other forms of culling (e.g., back-face culling), and/or performing other operations. The primitive assembler 602 outputs the processed primitives, with clipped triangles and culled triangles being removed, to the coarse binner 410.

The coarse binner 410 generates "reconstituted" draw calls from the geometry output by the primitive assemblers 602. Reconstituted draw calls are draw calls that are sorted in coarse bin order. More specifically, the draw calls include "coarse bin sets" that are sets of draw calls whose primitives overlap a particular coarse binning tile 504. For each coarse binning tile 504, the coarse binner 410 includes the draw calls, of the draw calls originally input to the input assembler stage 302, which have at least one primitive that overlaps that coarse binning tile 504. If a draw call has no such primitives, then the coarse binner 410 does not include that draw call for that coarse binning tile. In addition, for draw calls that do include primitives that overlap a coarse binning tile 504, the coarse binner 410 removes primitives from those draw calls that do not overlap the coarse binning tile 504. Any particular draw call input to the input assembler stage 302 can be output multiple times, once for each coarse bin overlapped by that draw call (i.e., once for each draw call that has a primitive that is not culled and that overlaps that coarse bin). Thus, for each coarse bin, the coarse binner 410 outputs all of the draw calls input to the input assembler stage 302, except for those draw calls that do not have any primitives that overlap the coarse bin. Further, the coarse binner 410 removes primitives from output draw calls that do not overlap the coarse bin, and also does not include culled primitives. The coarse binner 410 may otherwise modify such draw calls, such as by compressing the draw calls.

In addition to the above, the coarse binner 410 operates in parallel. The coarse binner 410 includes coarse bin identifiers 604, geometry input buffers 606, a geometry reordering and compression unit 608, and geometry output buffers 610. Each rendering engine 402 has a coarse bin identifier 604, a geometry input buffer 606, and a geometry output buffer 610, and the rendering engines 402 share a geometry reordering and compression unit 608. As described above, for parallel processing, the input assembler stage 302 sends different draw calls to the different parallel world space pipeline 404. Thus, the information received by each coarse bin identifier 604 is derived from the portion of draw calls (or sub-portions of draw calls—i.e., primitive groups) submitted to the world space pipeline 404 of the same rendering engine. For the primitives received by the coarse bin identifiers 604, the coarse bin identifiers 604 identify which coarse bins are overlapped by such primitives. Any particular coarse bin identifier 604 can process primitives that overlap the coarse binning tiles 504 that are assigned to any rendering engine 402 for the fine binning pass. More specifically, in the fine binning pass, one rendering engine 402 processes draw calls assigned to one set of coarse binning tiles 504 and another rendering engine 402 processes draw calls assigned to a different, mutually exclusive set of binning tiles 504. The coarse bin identifiers 604 output primitives based on which coarse bins they overlap to the geometry input buffers 606. Each geometry input buffer 606 can store primitives in bins assigned to any rendering engine 402 in the fine binning pass.

The geometry reordering and compression unit 608 generates the reconstituted draw calls for the different rendering engines 402. It should be understood that in some examples, instead of reconstituted draw calls, the geometry reordering and compression unit 608 generates reconstituted primitive groups from primitive groups that are smaller than an entire draw call. Where the term "reconstituted draw call" is used herein, this term can be substituted with "reconstituted primitive groups." Each geometry output buffer 610 stores reconstituted draw calls for one rendering engine 402 and not for another rendering engine 402. In an example, the geometry output buffer 610(1) stores draw calls having triangles that overlap the coarse binning tiles 504 associated with the first rendering engine 402 but does not store draw calls having no triangles that overlap any of those coarse binning tiles 504.

One operation that the geometry reordering and compression unit 608 performs is "stitching" the primitives into application programming interface ("API") order. API order is the order requested by the original generator of the draw calls (e.g., the processor 102). The processor 102 or other requestor that requests geometry be drawn expects that the geometry is drawn in the order in which that geometry (as draw calls) is submitted to the APD 116. Because API order must be maintained, and because geometry for any particular coarse binning tile 504 can be processed in either rendering engine 402 in the coarse binning pass, the geometry reordering and compression unit 608 "stitches" together the geometry received from all of the rendering engines 402, making sure that geometry is not submitted to the pipeline for the fine rendering pass out of API order. In other words, because in the coarse binning pass, either rendering engine 402 can process draw calls that will end up in any rendering engine 402 in the fine binning pass, the geometry order and compression unit 608 must combine primitives from both rendering engines 402 and thus must wait to receive such primitives from the different rendering engines 402 to be combined in API order.

As described above, the geometry reordering and compression unit 608 generates the draw calls. As also described above, the draw calls specify primitives using vertex indices. Thus, the geometry reordering and compression unit 608 requires the indices from the input assembler stage 302 (which receives those indices as input, e.g., from the processor 102) to reconstitute the draw calls FIGS. 7A and 7B illustrate two different techniques for distributing the indices from the input assembler stage 302 to the geometry reordering and compression stage 608.

Figure 7A:
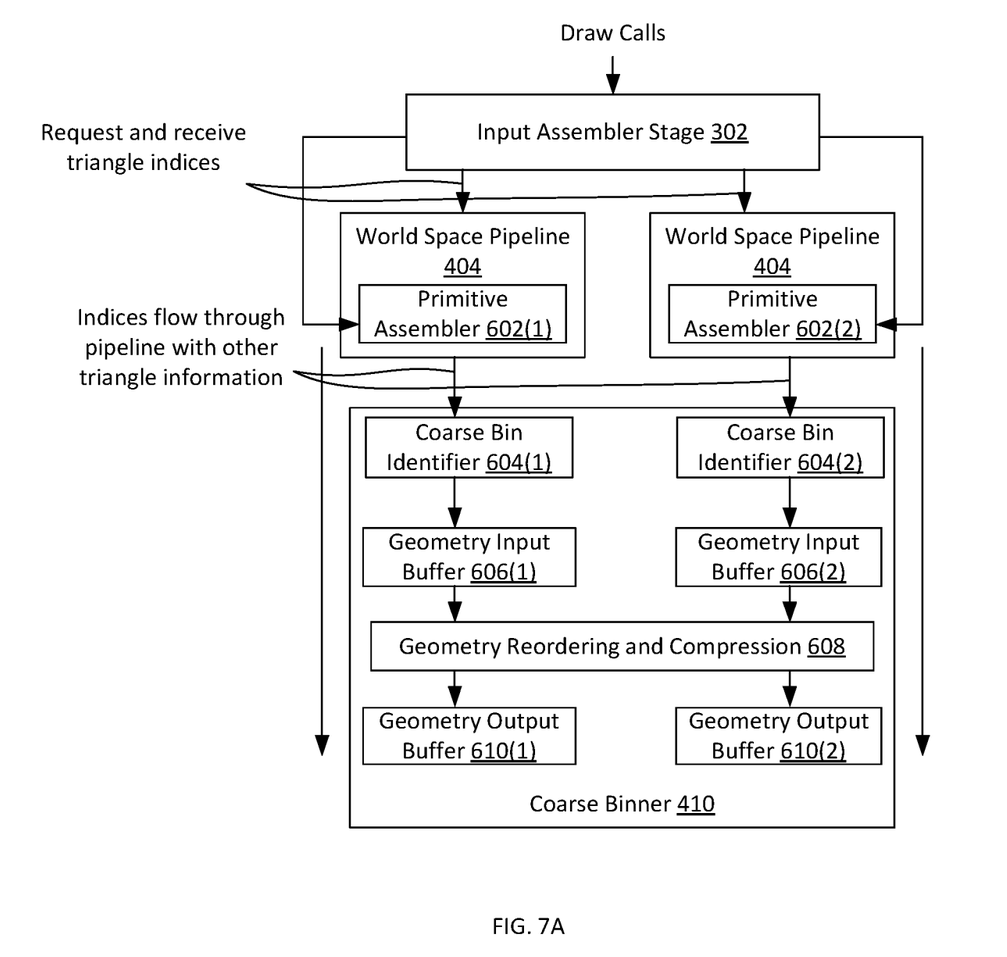
FIG. 7A illustrates a configuration in which the primitive assembler requests the indices from the input assembler stage and provides those indices along with the primitive data output by the primitive assembler.

In FIG. 7A, the primitive assembler 602 requests the indices from the input assembler stage 302 and provides those indices along with the primitive data output by the primitive assembler 602. In other words, each primitive assembler 602, in the course of generating and outputting primitives for processing by the coarse binner 410, requests the indices for those primitives and sends those indices to the coarse binner 410 along with the primitives. The coarse binner 410 passes indices through to the geometry reordering and compression unit 608, which generates the draw calls based on the primitive data and the indices. In some examples, instead of actively requesting the indices, the input assembler stage 302 can schedule transmission of the indices to the primitive assembler 602 for receipt at an appropriate time, i.e., when the primitive assembler 602 receives the geometry processed by the remainder of the world space pipeline 404. In other words, instead of a "pull" model in which the primitive assembler 602 specifically requests indices, a "push" model occurs, in which the input assembler stage 302 transmits the indices to the primitive assembler 602 at the appropriate time, i.e., at a time that would result in the indices being received by the primitive assembler 602 is processing the primitives associated with those indices.

Figure 7B:
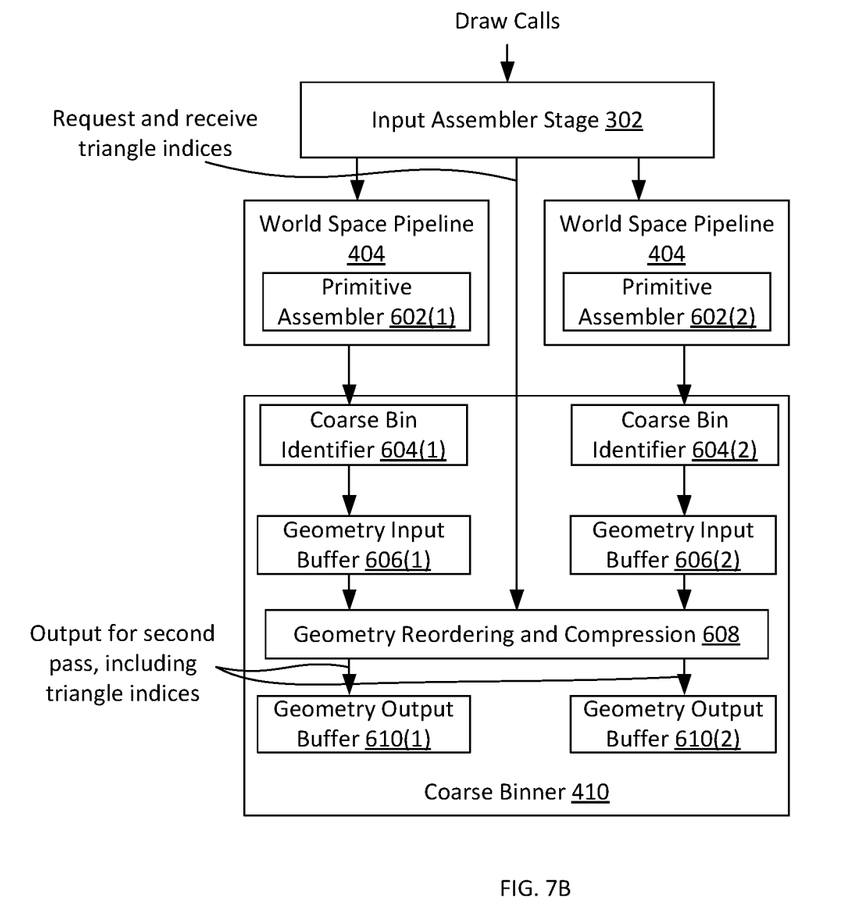
FIG. 7B illustrates a configuration in which the geometry reordering and compression unit requests the indices for the primitives from the input assembler stage, bypassing the other parts of the world space pipeline and the prior units of the coarse binner.

By contrast, FIG. 7B illustrates a different technique, in which the geometry reordering and compression unit 608 requests the indices from the input assembler stage 302. The difference with FIG. 7A is that, in FIG. 7A, the primitive assembler stage 302 is the unit that receives the indices from the input assembler stage 302. By contrast, in FIG. 7B, the geometry reordering and compression unit 608 is the unit that receives the indices for the primitives from the input assembler stage 302, bypassing the other parts of the world space pipeline 404, including the primitive assembler 602, and the prior units of the coarse binner 410. The input assembler stage 302 transmits the indices to the geometry reordering and compression unit 608, which generates the reconstituted draw calls based on the indices and the received geometry. In some examples, rather than requesting the indices, the input assembler stage 302 provides the indices to the geometry reordering and compression unit 608 at a time that coincides with the geometry reordering and compression unit 608 receiving the associated geometry from the rest of the coarse binner 410.

In summary, the geometry reordering and compression unit 608 requires vertex indices from draw calls originally provided to the input assembler stage 302 in order to reconstitute new draw calls for replay in the fine binning pass. To create these reconstituted draw calls, the input assembler stage 302 provides these indices to the geometry reordering and compression unit 608 according to one of the mechanisms described herein. To avoid the need to carry this index data through all elements of the world space pipeline 404, the input assembler stage 302 does not provide these indices to at least a portion of the world space pipeline 404. Then, either the primitive assembler 602 or the geometry reordering and compression unit 608 receives the indices from the input assembler stage 302. These units may either request the indices or the input assembler stage 302 may simply provide the indices at an appropriate time, such as when the primitives associated with the indices are received by the primitive assembler 602 or the geometry reordering and compression unit 608. In the first case, a portion of the world-space pipeline 404 is bypassed for the indices and in the second case, the world-space pipeline 404 and a portion of the coarse binner 410 are bypassed for the indices.

Figure 8:
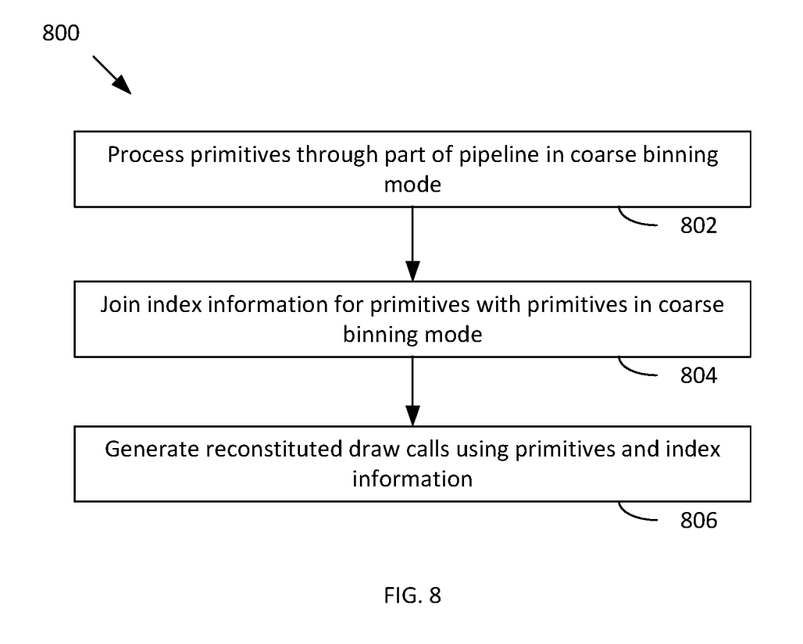
FIG. 8 is a flow diagram of a method for performing two level primitive batch binning.

FIG. 8 is a flow diagram of a method 800 for performing two level primitive batch binning, according to an example. Although described with respect to the system of FIGS. 1-7B, those of skill in the art will understand that any system configured to perform the steps of the method 800 in any technically feasible order falls within the scope of the present disclosure.

At step 802, a world-space pipeline 404 of a graphics processing pipeline 134 processes primitives in a coarse binning mode. In this coarse binning mode, the world-space pipeline 404 processes primitives, transforming the coordinates of the primitives from world-space to screen space. At step 804, the graphics processing pipeline 134 joins vertex index information with primitives in the coarse binning mode. In one implementation or mode of operation, a primitive assembler 602 receives the index information from the input assembler stage 302 and joins that information with the primitive information processed through the world-space pipeline 404 (e.g., triangles with vertices transformed into screen-space), and then transmits the primitive and index information to the coarse binner 410 for coarse binning. In another implementation or mode of operation, a geometry reordering and compression unit 608 receives the indices from the input assembler stage 302. More specifically, the world-space pipeline 404 processes the primitives, transforming the vertices of the primitives into screen space and providing the results to the coarse binner 604. The coarse bin identifier 604 identifies one or more coarse binning tiles 504 overlapped by each such primitive and places the primitives into the geometry input buffer 606 in a manner that indicates which coarse bins such primitives overlap. Note that the above steps are performed by multiple rendering engines 402. Each rendering engine 402 places the primitives processed by the rendering engine 402 into the geometry input buffer 606 of that rendering engine 402. Thus the geometry input buffers 606 of different rendering engines 402 provide primitives processed by different rendering engines 402 to the geometry reordering and compression unit 608. The geometry reordering and compression unit 608 receives these primitives and the indices in this implementation or mode of operation.

At step 806, the geometry reordering and compression unit 608 generates reconstituted draw calls using the primitives and index information received either directly from the input assembler stage 302 or via the primitive assembler 602. Generating the reconstituted draw calls involves ordering the primitives received from both rendering engines 402 in API order and generating draw calls for such primitives, where each draw call includes indices received from the input assembler stage 302. The draw calls are generated in such a way that, when processed in the fine binning pass, results in an ordering of primitives that is according to the coarse binning tiles 504. In other words, the draw calls are ordered by coarse binning tiles 504, and thus specify the primitives in the order of coarse binning tiles 504. In an example, the draw calls specify primitives in the order of the primitives that overlap a first coarse binning tile 504 and then primitives that overlap a second binning tile 504 and then primitives that overlap a third binning tile 504, and so on. In some examples, this ordering causes the rendering engines 402 to process the primitives that overlap a first coarse binning tile 504 and then to process the primitives that overlap a second coarse binning tile 504 and then to process the primitives that overlap a third coarse binning tile 504, and so on. In addition, within the draw calls, the primitives are ordered in API order such that, when processed in the fine binning pass, the primitives are processed in API order within each coarse binning tile 504.

Although a certain number of various elements are illustrated in the figures, such as two rendering engines 402, this disclosure contemplates implementations in which there are different numbers of such elements.

The various functional units illustrated in the figures and/or described herein (including, but not limited to, the processor 102, the auxiliary devices 106, auxiliary processors 114, the APD 116, the IO devices 117, the APD scheduler 136, the graphics processing pipeline 134, the compute units 132, the SIMD units 138, each stage of the graphics processing pipeline 134 illustrated in FIG. 3, or the elements of the rendering engines 402, including the coarse buffer 414, fine binning buffer 416, two-level primitive batch binner 408, coarse binner 410 (and units therein, such as primitive assembler 602, coarse bin identifier 604, geometry input buffer 606, geometry reordering and compression unit 608, and geometry output buffer 610), screen-space pipeline 406, fine binner 412, and fine binning buffer 416, may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system, comprising:
   an input assembler;
   a world-space pipeline;
   a screen-space pipeline; and
   a coarse binner configured to:
      in a coarse binning pass, generate a sorted set of draw calls, based on geometry processed through the world space pipeline and vertex indices obtained from the input assembler, and
      initiate a fine binning pass in which the sorted set of draw calls is processed through the world-space pipeline and the screen-space pipeline.

2. The system of claim 1, further comprising a primitive assembler configured to receive the indices from the input assembler.

3. The system of claim 1, wherein the coarse binner is further configured to receive the indices from the input assembler at a geometry rendering and compression unit of the coarse binner.

4. The system of claim 1, wherein the coarse binning pass is performed in parallel by a plurality of rendering engines.

5. A device, comprising:
   an input assembler;
   a world-space pipeline; and
   a coarse binner configured to:
      in a coarse binning pass, generate a sorted set of draw calls, based on geometry processed through the world space pipeline and vertex indices obtained from the input assembler, and
      initiating a fine binning pass in which the sorted set of draw calls is processed through the world-space pipeline and a screen-space pipeline.

6. The device of claim 5, further comprising a primitive assembler configured to receive the indices from the input assembler.

7. The device of claim 5, wherein the coarse binner is further configured to receive the indices from the input assembler at a geometry rendering and compression unit of the coarse binner.

8. The device of claim 5, wherein the coarse binning pass is performed in parallel by a plurality of rendering engines.

9. The device of claim 5, wherein generating the sorted set of draw calls includes generating draw calls having primitives sorted by coarse binning tile.

10. The device of claim 9, wherein the primitives are further sorted by application programming interface order.

11. The device of claim 5, wherein at least a portion of the world-space pipeline receives the geometry but does not receive the vertex indices.

12. The device of claim 5, wherein the input assembler is configured to transmit to a destination unit at a time that coincides with the destination unit receiving the geometry, the vertex indices.

13. A method for rendering, comprising:
   in a coarse binning pass, generating a sorted set of draw calls, based on geometry processed through a world-space pipeline and vertex indices obtained from an input assembler; and
   initiating a fine binning pass in which the sorted set of draw calls is processed through the world-space pipeline and a screen-space pipeline.

14. The method of claim 13, further comprising receiving the indices from the input assembler at a primitive assembler.

15. The method of claim 13, further comprising receiving the indices from the input assembler at a geometry rendering and compression unit.

16. The method of claim 13, wherein the coarse binning pass is performed in parallel by a plurality of rendering engines.

17. The method of claim 13, wherein generating the sorted set of draw calls includes generating draw calls having primitives sorted by coarse binning tile.

18. The method of claim 17, wherein the primitives are further sorted by application programming interface order.

19. The method of claim 13, wherein at least a portion of the world-space pipeline receives the geometry but does not receive the vertex indices.

20. The method of claim 13, further comprising transmitting, by the input assembler, to a destination unit at a time that coincides with the destination unit receiving the geometry, the vertex indices.

* * * * *